April 19, 1932. B. BRONSON 1,854,780
STEERING WHEEL
Filed May 31, 1929 2 Sheets-Sheet 1
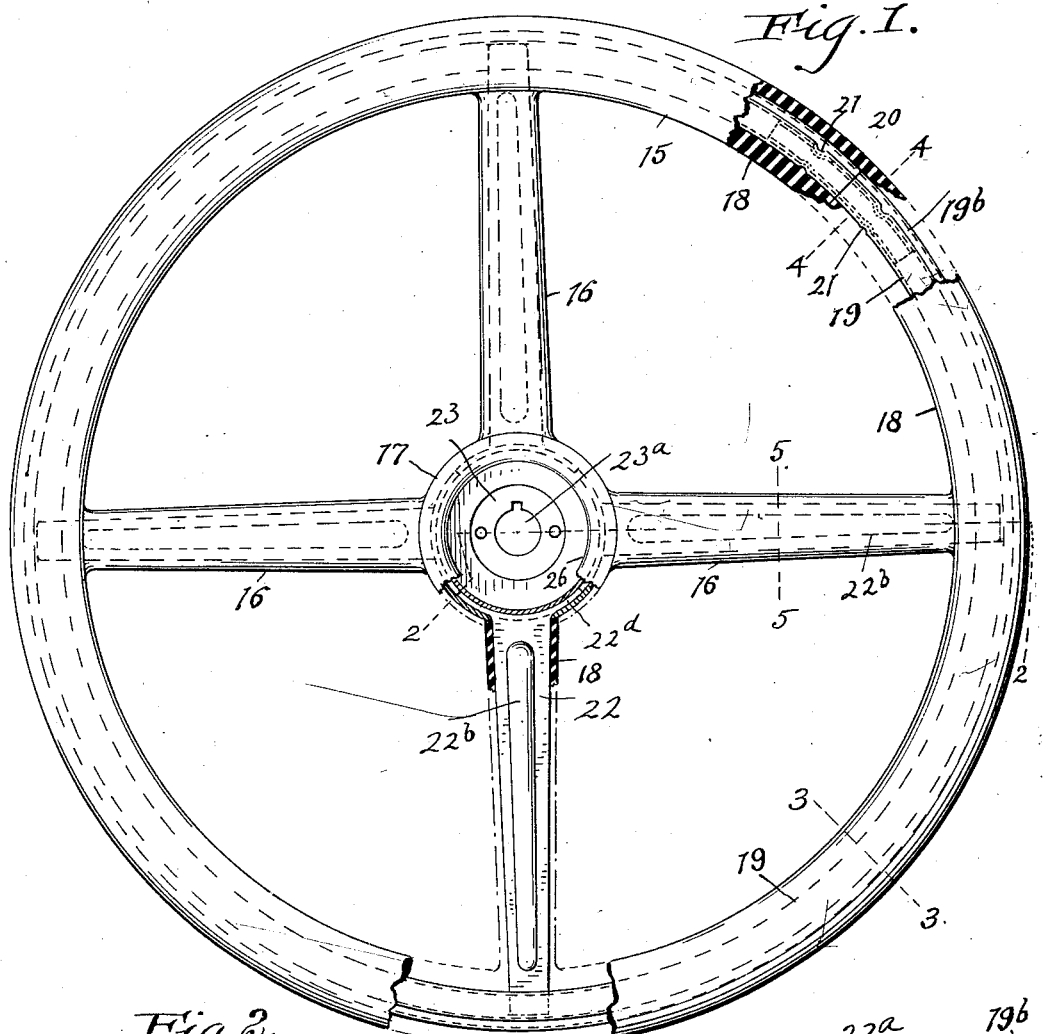
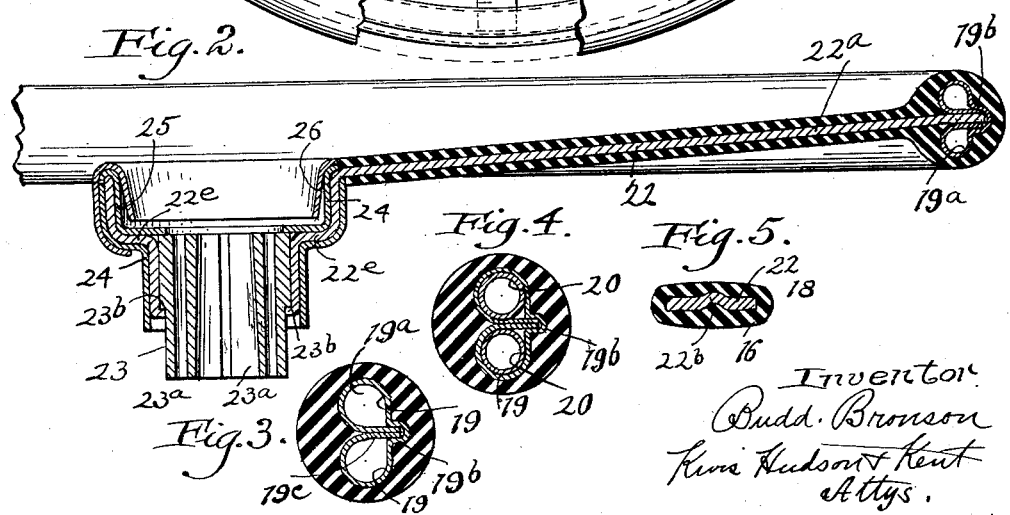
Inventor
Budd Bronson
Kim Hudson & Kent
Attys.

April 19, 1932.  B. BRONSON  1,854,780
STEERING WHEEL
Filed May 31, 1929   2 Sheets-Sheet 2
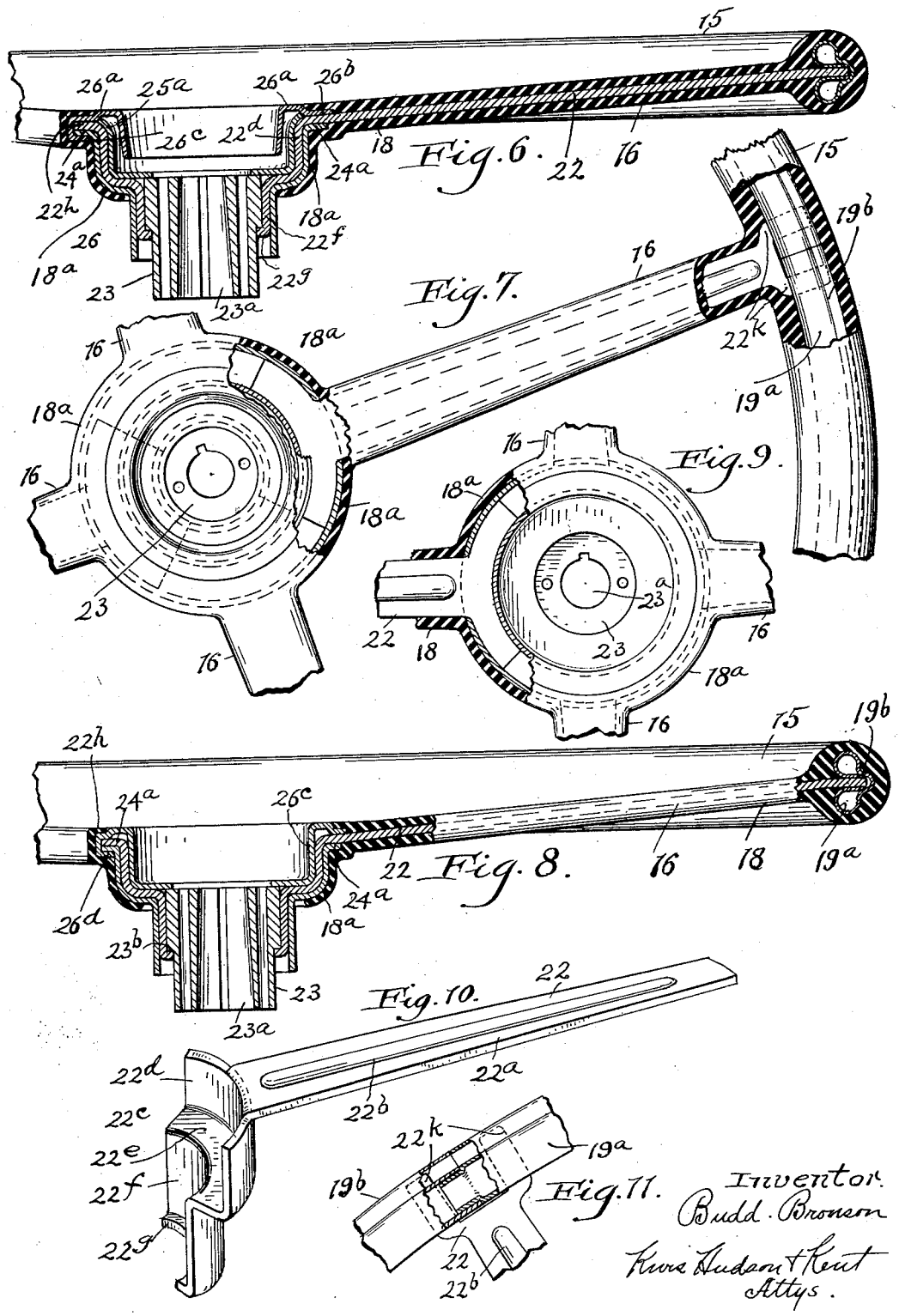

Patented Apr. 19, 1932

1,854,780

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

STEERING WHEEL

Application filed May 31, 1929. Serial No. 367,293.

This invention relates to steering wheels, and has particular reference to wheels built up of metal parts, chiefly stampings, and generally covered with rubber or other suitable non-metallic surfacing material.

The principal object of the invention is to provide a wheel which is strong and otherwise satisfactory in use and which can be produced inexpensively. Otherwise stated, it is one of the objects of the invention to provide wheels which are as good as or better than those now in use but which are so constructed that they can be produced at materially less cost, it being one of the features of the invention that the usual mechanical fastening expedients, such as rivets and welds, are substantially and preferably entirely avoided.

The invention resides in various parts of the wheel, including the rim, the spokes or spider arms, and the hub, all these parts being shaped so as to avoid excessive scrap in stamping and forming them and to admit of their rapid and effective assembly, with the joints and connections between the parts effected principally if not entirely by pressure in one stroke of a press. In this way, and, additionally, by forming parts of the wheel and particularly the rim into a hollow shape capable of resisting the severe pressure to which the parts are subjected when the rubber covering is applied and vulcanized thereto, so that less rubber than heretofore is required, the cost of production is reduced to practically a minimum.

The invention may be further briefly summarized as consisting in certain novel details of construction and combinations and arrangements of parts which will be described in the specification and set forth in the appended claims.

In the accompanying sheets of drawings,

Fig. 1 is a plan view of the wheel formed in accordance with my invention, parts being broken away and in section;

Fig. 2 is a sectional view on an enlarged scale substantially along the line 2—2 of Fig. 1;

Figs. 3, 4, and 5 are sectional views substantially along the lines 3—3, 4—4 and 5—5 of Fig. 1, on the enlarged scale of Fig. 2;

Fig. 6 is a sectional view corresponding to Fig. 2, showing a slight modification;

Fig. 7 is a fragmentary plan view of the same, parts being broken away;

Fig. 8 is a view corresponding to Fig. 6, showing a further slight modification;

Fig. 9 is a plan view, partly in section, of the hub of Fig. 8;

Fig. 10 is a perspective view of a stamping such as may be used in forming the arms or spokes of the wheel; and Fig. 11 is a fragmentary detail view showing more clearly than in Fig. 7 the manner in which the ends of the rim may be spliced and held together.

The wheel is composed of a rim 15, the spokes or spider arms 16, and the hub 17. These parts are all formed of metal, but the rim and arms and in some instances part of the hub are covered with rubber or other suitable surfacing material which is designated generally by the reference character 18. In speaking of these main portions of the wheel, i. e., the rim, spokes or arms and hub, I generally have reference to the metal structure of these parts, as it is in the latter that the invention resides.

The rim is preferably formed of one piece or from a single stamping shaped into novel tubular form and then bent to circular contour and its ends suitably united. The tubular shape of the rim is perhaps best illustrated in Fig. 3, where it is designated as a whole by the reference character 19. It is desirable that the rim be tubular so as to reduce the amount of rubber required to cover it and, in accordance with the present invention, such a cross-sectional shape is imparted to the tubular rim that it can withstand the pressure of vulcanization without the danger of crushing even though thin gauge sheet metal is employed, and, furthermore, the shape is such that it admits of the rapid and effective connection between the rim and the spider arms by pressure alone obtained in the press in which the main assembly takes place.

By referring particularly to Fig. 3, it will be seen that the rim member 19 has two lobes 19a, one lying vertically above the other, there being a channel 19b, at the outer side or at the outer periphery of the rim centrally thereof, and the sides of the stamping being brought together face to face on the interior of the rim, as indicated at 19c, forming a central strengthening rib, the free edge of which fits within the channel 19b. This leaves an inwardly facing, substantially V-shaped groove on the inner side of the rim member 19 opposite the channel 19b for the admission of the outer ends of the spider arms, as will be presently explained.

The free ends of the tubular rim may be united in various ways. In Fig. 1 the ends are shown in abutting relation and are indicated as being held in that relation by one or more tubular inserts 20 which may consist of metal tubes inserted into the two halves of the channel of each end of the rim and the parts held in the desired relation by crimping, indicated at 21, or otherwise. The ends may be united in a similar manner by using an external splicing sleeve slipped over the abutting ends or by telescoping one end into the other and fastening them in that relation, as will be referred to presently.

The spider arms are preferably formed from separate stampings 22, each stamping being composed of an arm portion 22a which will be flat or substantially flat, if flat, relatively thin arms are desired, or may be tubular if relatively thick arms are required. The former is shown in this instance, but I might here state that if tubular arms are employed, the shape of the tubular portion may be exactly like that employed in forming the tubular rim. In speaking of flat arms, I do not mean to imply that the arms are flat in the true sense of the word, for it is obvious that they may be ribbed or corrugated, as indicated at 22b, for strengthening purposes.

In addition to the straight or substantially straight arm portion 22a, each stamping 22 has also a quadrant-shaped hub portion designated as a whole by the reference character 22c. In the assembled wheel, these portions of the several arms engage or substantially engage end to end. Each of the quadrant-shaped portions 22c includes an upper cylindrically curved segment 22d which depends from the inner end of the straight portion 22a of the arm and at the bottom of which is an inwardly extending flange 22e depending from which is a portion 22f the shape of which will depend upon the external shape of the core or insert which is adapted to receive the shaft of the steering column. If this core is cylindrical in external shape, the portion 22f will be cylindrically curved. If the core is non-circular in cross-section externally, such as square, hexagonal or octagonal, the portion 22f will be correspondingly shaped inasmuch as it is adapted to fit up against and conform to the external shape of one-quarter of the core. At the bottom of the portion 22f is an inturned flange 22g which is adapted to engage under an external shoulder formed on the core or insert which receives the shaft of the steering column, as will be presently explained.

The outer ends of the arms 22 are secured to the rim by being extended or forced outwardly through the central internal rib 19c of the rim into the channel 19b. This spreads apart the two portions of the stamping forming the rib 19c and also to an extent spreads the channel, causing a very tight fit between the arm and the rim. This is accomplished in the closing or assembling operation performed in the press which, by crimping or indenting the channel on opposite sides of that portion occupied by the outer end of the arm, tightly and securely fastens the arm to the rim. The outer ends of all the arms are fastened to the rim in this same manner at the same time that the parts constituting the hub of the wheel are forced into engaging relationship.

The inner or hub portions 22c of the arms in effect form a part of and are securely held in the hub of the wheel. This hub includes a core or insert 23 which may be a casting, a forging, or a screw machine product, in which event it will be formed from a suitably shaped bar, and it is provided with the usual tapered opening 23a designed to be keyed or otherwise secured to the shaft of the steering column and between its ends with an external shoulder 23b. The hub includes also a pair of cup-shaped stampings, consisting of an outer cup 24 and an inner cup 25 between which are clamped the hub portions 22c of the spider arms and the insert 23. The outer cup 24 fits about and tightly engages the cylindrically curved upper portions 22d of the arms and extends inwardly under the portions 22e thereof and downwardly along the lower portions 22f, the latter being clamped between the lower portion of this cup and the core or insert 23, the external shoulder 23b being engaged by the lower inturned flanges 22g of the hub portions of the arms.

The upper cup 25 engages the inner surfaces of the portions 22d of the arms and the bottom of this cup extends over the inwardly extending portions 22e and over a portion of the core or insert 23. Between the arms the upper portion of the cup 25 may be bent over the upper edge of the portions 22d of the arms so as to be contiguous to the upper edge of the outer cup, as clearly shown in Fig. 2.

In the construction shown in Figs. 1 and 2, the hub includes also a horn-button holder in the form of a stamping 26 which is fitted into the upper cup 25 and between the spider arms may be extended downwardly around the upper portion and inwardly under the inturned portion of the outer cup, as shown at the left-hand side of Fig. 2.

In accordance with the preferred method of assembly, the rim, with its ends united or spliced together in the manner shown in Fig. 2 or otherwise, the arms, and the parts constituting the hub, are all assembled together in a press with the parts loosely engaging one another but properly relatively disposed for final assembly. At this time the outer ends of the arms 22 rest loosely in the V-shaped groove on the inner side of the rim and the parts forming the hub and the arms are displaced from their normal position with respect to the rim, the arms being considerably more inclined either upwardly or downwardly than in the completed wheel. Then the press is closed and in this one operation the middle portion of the wheel is forced axially inward toward the plane of the rim and the arms are more or less straightened with a toggle-like action, driving the outer ends of the arms to their final positions previously described, and, as illustrated in Figs. 2, 6 and 8, causing such a tight fit that they are thus tightly secured to the rim. As already pointed out, the outer channel 19b may in this closing operation be crimped inwardly on both sides of the outer ends of the arms to guard against the possibility of any lateral movement between the rim and arms, but this is not regarded as essential. At the same time that the above occurs, suitable die members which receive the hub portion of the wheel compress the outer cup 24 and expand the inner cup 25, as well as bend to final position the top of the latter and the outer part of the horn button holder 26 so as to cause all parts forming the hub to be tightly and permanently locked together and held against relative movement, all the parts of the wheel then occupying the relative positions shown in Fig. 2. It is to be noted that all parts of the hub portions of the arms are clamped between the inner and outer cups or between the outer cup and the insert and that the latter is tightly held against rotation by the inward pressure of the lower parts of the hub portions of the arms and by the axial gripping pressure between the bottom of the inner cup and the flanges on the lower ends of the hub portions of the arms, which flanges engage the shoulder 23b. Thus in one operation the spider arms are fastened to the rim and their inner ends are secured in the hub and the parts of the hub are pressed into tight relation with the hub portions of the arms and with the insert so that the entire assembly and the fastening of all these portions together is not only accomplished at one time or with one stroke of the press but without requiring the use anywhere of securing rivets or of welding or brazing operations.

The wheel is now complete except for the application of the non-metallic covering 18 which is preferably rubber, as already stated, this rubber covering the rim and arms up to the hub proper. As previously noted, though the rim is formed in the tubular shape of relatively thin gauge sheet metal, it is capable of withstanding the severe pressure in the vulcanizing operation, and the same will be true of the arms should they be given between the inner hub portions and the outer rim engaging portions a tubular shape like that employed in the rim. With the rim designed as herein illustrated not enough rubber is required to add very greatly to the cost of the completed wheel.

The construction shown in Figs. 6 and 7 and that shown in Figs. 8 and 9 are similar in principle to that described above and the parts are united or fastened together in the same way as described in connection with the construction illustrated in Figs. 1 to 5. The same shape of rim is employed and the arms and the parts forming the hub are substantially like the corresponding parts illustrated in Figs. 1 to 5.

The wheel shown in Figs. 6 and 7 differs from that shown in Fig. 2 in the following respects. The quadrant shaped hub portion of each of the arm stampings is at the top flanged outwardly as shown at 22h at the left-hand side of Fig. 6. The outer cup is provided at the top with an outwardly extending lateral flange 24a which extends completely around beneath the arms including the outturned flanges 22h on the hub portions of the spider arm stampings. The top of the inner cup here designated 25a is not bent downwardly between the spider arms, and the horn button holder here designated 26a has at the top a flange 26b which extends over the inner portions of the spider arm stampings and between the arms is bent downwardly around underneath the outturned flanges 22h and 24a at the hub end of the spider arm stampings and outer cup, respectively, as shown at 26c at the left-hand side of Fig. 6. Additionally, the covering of rubber or the like is extended inwardly somewhat farther than illustrated in Figs. 1 and 2, so as to encircle the outer part of the hub both at and between the spider arms, this being illustrated at 18a in Figs. 6 and 7.

A different way of splicing or joining the ends of the rim is illustrated in Fig. 7. Instead of using splicing inserts, as illustrated in Fig. 1, the joint is made by telescoping one end of the tube forming the rim slightly into the other, and as here illustrated, the joint is made opposite one of the spider arms and the spider arm stamping at its outer end is in the form of a hook designated 22k, the hooked end being driven outwardly on opposite sides of the joint (in the closing operation already described), and the two fingers of the hook are thus tightly engaged with the end portions of the rim tube so as to hold them together against the possibility of spreading. The same type of joint may, of course, be used with the other modified construction herein described, but in any event it is not necessary that the spider arm be used to lock the joint for the joint may occur between the arms and the telescopic ends may be locked together by indentation or otherwise.

The construction illustrated in Figs. 8 and 9 is very similar to that shown in Figs. 6 and 7, and differs therefrom only in the respect that the horn-button holder corresponding to the member 26 of Fig. 2 and the member 26a of Fig. 6 is omitted and the upper or inner cup of the hub, here designated 26c, is at the top flanged outwardly over the spider arm stampings and between the arms has portions designated 26d which are bent downwardly around and inwardly under the flanges 22h and 24a formed at the top of the hub portions of the spider arm stampings and the outer cup respectively, as described in connection with Figs. 6 and 7. Thus the inner and outer cups are tightly locked together at the top of the hub, this being accomplished, of course, in the closing operation already described. The covering 18a of rubber or the like encircles the outer portion of the hub as well as the arms and rim, as in Figs. 6 and 7.

I have already pointed out that the core or insert 23 may have an external polygonal shape to avoid the possibility of relative turning movement between the insert and the remaining parts of the hub which engage it. If an insert which is polygonal externally is employed, one having a good many sides, such as octagonal, is preferably utilized as the shape approximating a round is preferable, but whether the insert is round or polygonal is immaterial to the invention for in the latter case the lower portions 22f of the hub ends of the spider arm stampings and the lower portion or skirt of the outer cup are in the closing operation pressed inwardly so as to tightly and closely conform to the polygonal shape of the insert. Of course, the insert may be ribbed instead of being made polygonal. Furthermore, the idea of a positive interlock between the insert and hub portions of the arms may be extended also to the outer cup and hub portions of the arms by providing on the two parts, respectively, interfitting ribs and grooves.

Above I have described the principle of my invention and have illustrated certain modifications in the details of the parts of which the wheel is built up, but I wish it to be understood that I am not to be limited to the precise details or form of the parts herein illustrated and described as other changes may be made without departing from the spirit and scope of the invention.

Having thus described my invention, I claim:

1. A tubular steering wheel rim formed from a stamping with a channel on the outer side and having one or more edge portions turned inwardly in line with the channel.

2. A tubular steering wheel rim formed from a stamping having on one side a centrally disposed channel and having one or more edge portions centrally disposed within the tube and extending crosswise of the latter into the channel.

3. A steering wheel comprising a tubular sheet metal rim, a hub, and spokes, the rim having a channel on the outer side and having the edge portions of the stamping folded inwardly into the channel and the outer ends of the spokes extending between the infolded portions and into the channel.

4. A steering wheel comprising a rim, spokes and a hub, the spokes having hub portions each extending for a distance circumferentially of the hub and composed of upper and lower parts radially offset, and hub members clampingly engaging the hub portions.

5. A steering wheel comprising a rim, arms and a hub, the hub having a cup-shaped depression at the top, and insert for engaging the shaft of the steering column at the bottom of the said depression, the arms having laterally extending hub portions, and members pressed together to clamp the hub portions of the arms between them and to the insert.

6. An arm for a steering wheel provided at one end with a segmental hub portion, there being between the top and bottom thereof a shoulder so that the upper part is outwardly offset from the lower part.

7. A steering wheel comprising a rim, arms and a hub, the arms having segmental hub portions which in the assembled wheel form a substantially continuous cup the upper portion of which is offset outwardly from the lower portion, a cup-shaped member tightly fitted into the cup, and a second member tightly enveloping the cup.

8. A steering wheel comprising a rim, arms and a hub, the arms having segmental hub portions which in the assembled wheel form a substantially continuous cup the upper portion of which is offset outwardly from the lower portion, a sheet metal cup-shaped member tightly fitted into the cup, a second sheet metal member tightly enveloping the cup, and an insert beneath the first mentioned sheet metal member, the lower parts of the hub portions of the arms being clamped between said insert and the lower portion of the second sheet metal member.

In testimony whereof, I hereunto affix my signature.

BUDD BRONSON.